United States Patent [19]

White et al.

[11] 4,094,428
[45] June 13, 1978

[54] METHOD AND APPARATUS FOR LOADING AND DISINTEGRATING SINGLE ROUND BALES

[75] Inventors: Bruce Lynn White, Newton; Mark Winfield Kiner, Hesston; Arlen Jacob Wiens, North Newton, all of Kans.

[73] Assignee: Hesston Corporation, Hesston, Kans.

[21] Appl. No.: 770,637

[22] Filed: Feb. 22, 1977

Related U.S. Application Data

[62] Division of Ser. No. 717,672, Aug. 25, 1976.

[51] Int. Cl.² .............................................. B60P 1/16
[52] U.S. Cl. .................................................. 214/505
[58] Field of Search ............... 214/508, 518, 78, 77 R, 214/501, 505; 241/101 A, 101.7

[56] References Cited

U.S. PATENT DOCUMENTS

| | | | |
|---|---|---|---|
| 2,322,306 | 6/1943 | McLaren | 241/101 A X |
| 2,575,639 | 11/1951 | Scranton et al. | 241/101 A X |
| 2,681,090 | 6/1954 | Hicks et al. | 241/101 A X |
| 2,738,633 | 3/1956 | Bestland et al. | 214/78 X |
| 3,979,074 | 9/1976 | White et al. | 241/101.5 X |
| 3,999,674 | 12/1976 | Meitl | 214/78 X |

*Primary Examiner*—Albert J. Makay
*Attorney, Agent, or Firm*—Schmidt, Johnson, Hovey & Williams

[57] ABSTRACT

A mover-disintegrator for large cylindrical bales of crop material is provided with a bale-supporting bed swingable toward and away from a bank of shredding rolls for forced, one-at-a-time feeding of bales into the rolls. A loading fork mounted on the rear of the machine is vertically swingable from a ground-engaging position to a vertical position adjacent the bed and is adapted to engage circumferentially supported, ground-lying bales for individually raising the bales from the ground to an end-supported position upon the bed. From its on-end position, a loaded bale is fed into the disintegrating rolls in a highly desirable end-first manner by swinging movement of the bed.

13 Claims, 7 Drawing Figures

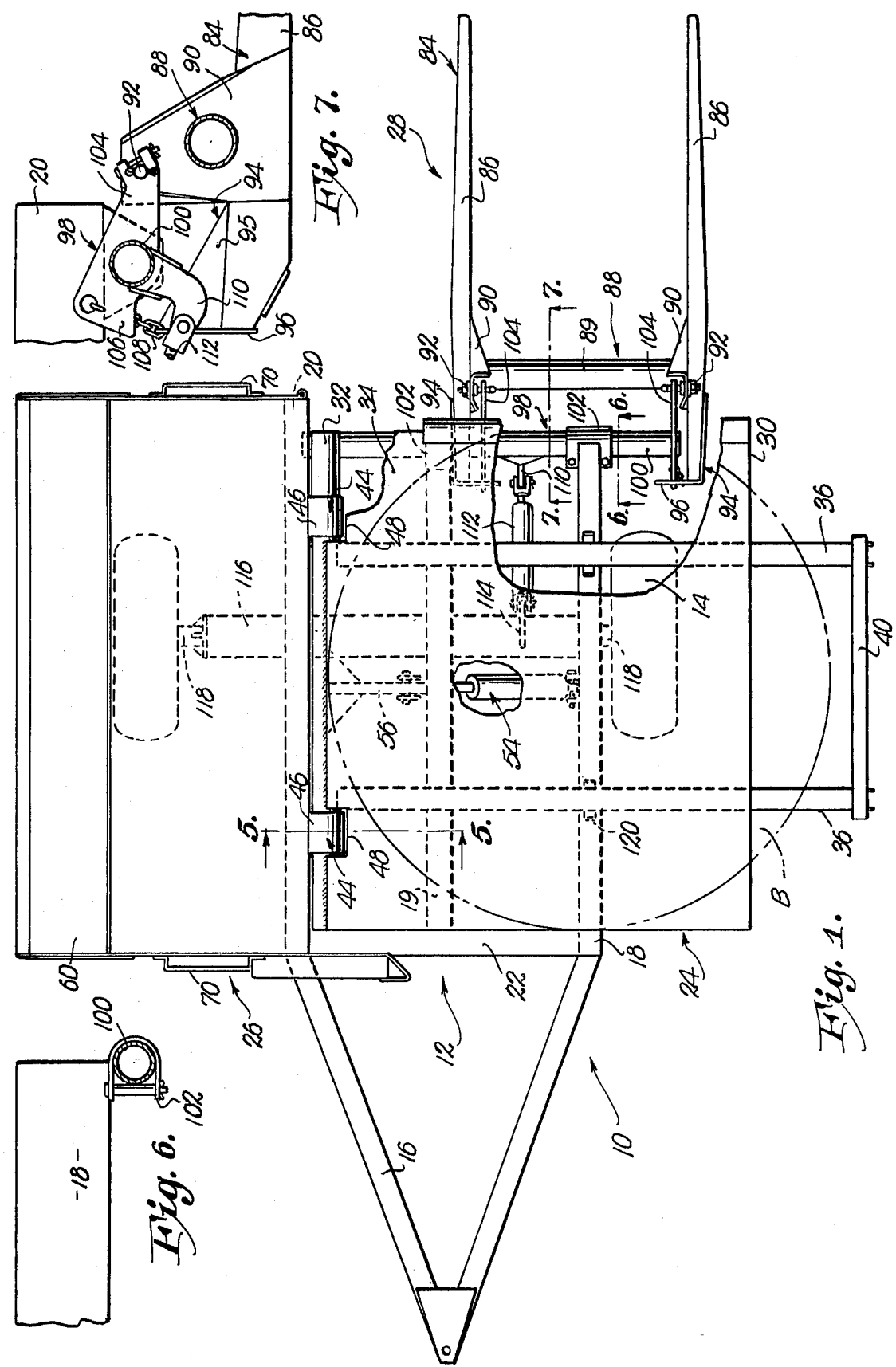

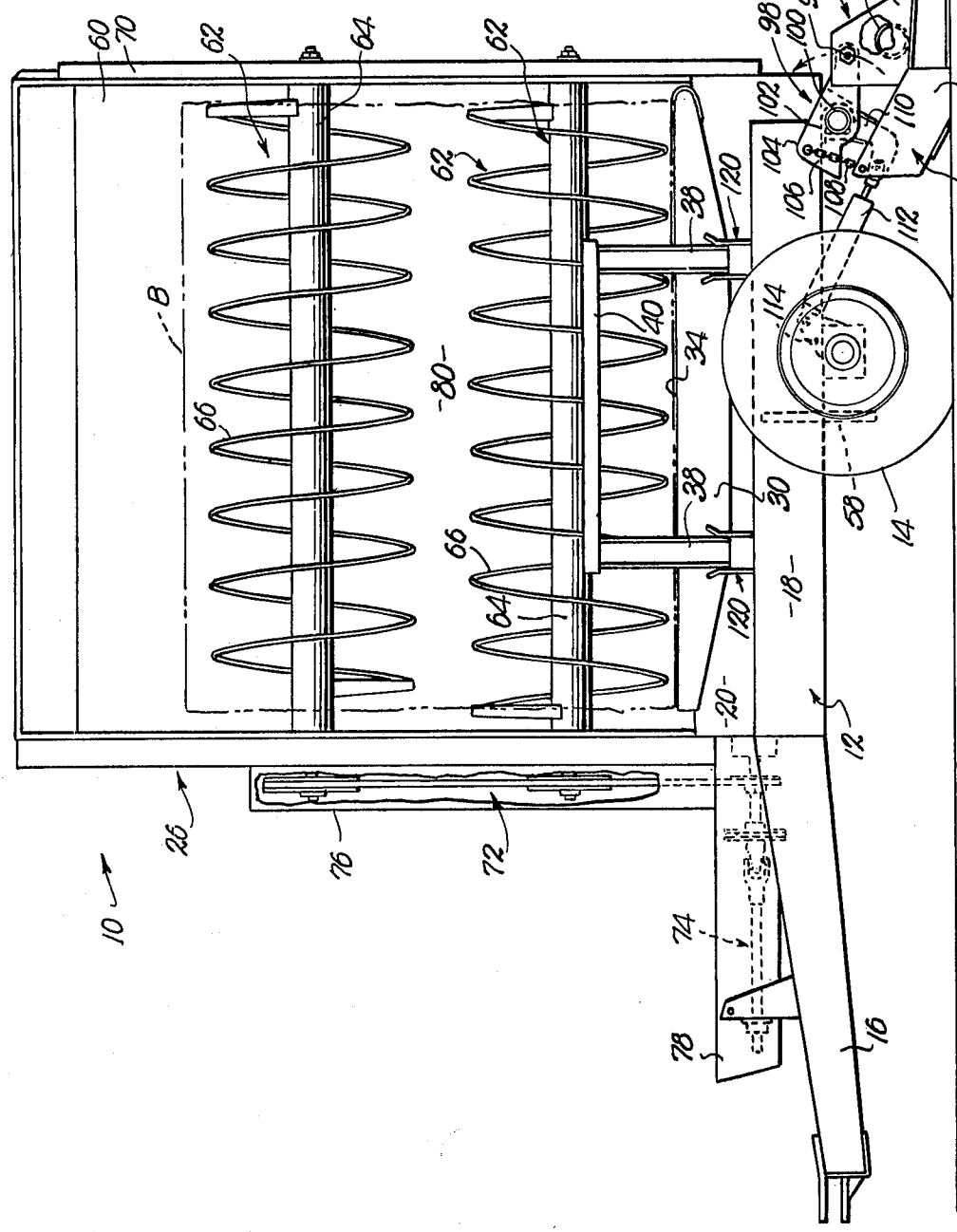

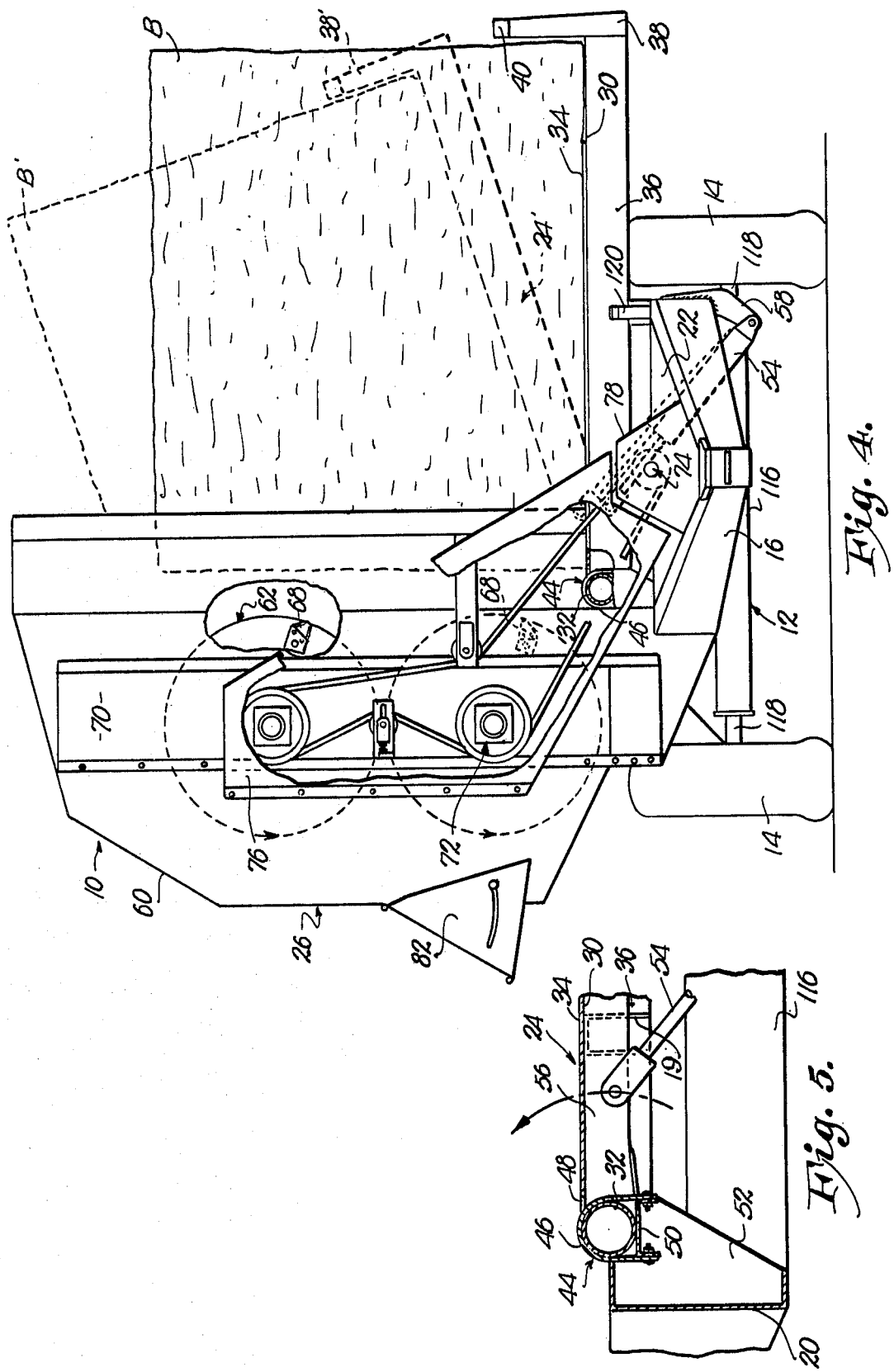

METHOD AND APPARATUS FOR LOADING AND DISINTEGRATING SINGLE ROUND BALES

This is a division of application Ser. No. 717,672, filed on 08/25/76.

This invention relates to machines and methods for shredding large bales of animal foodstuffs and particularly concerns an agricultural implement capable of loading, transporting and disintegrating large cylindrical or "round" bales. A machine embodying the principles of the present invention is operable to singularly engage ground-lying, circumferentially supported, cylindrical bales; loading the latter on the mobile bed for transport; and selectively feeding the bales into a disintegrator whereupon they are separated into constituent pieces of crop material which are subsequently delivered to the ground or a feed bunk in a convenient windrow configuration for desired feeding of livestock.

A machine similar to that of the present invention and capable of disintegrating large masses of compacted crop material is disclosed in the recently allowed patent application, Ser. No. 514,110, entitled "Method And Apparatus For Processing Crop Stacks", filed Oct. 11, 1974. While like the present invention in some respects, the machine disclosed in the previously mentioned application is not as suited for handling large cylindrical bales as the present invention described hereinbelow.

It is one important object of the present invention to provide an agricultural implement capable of loading, transporting, disintegrating, and distributing crop material which has been formed into large cylindrical bales for efficient handling and weather shedding, all without the need for auxiliary loaders, movers or processors, and requiring only one operator for satisfactory performance.

It is another important object of our invention to provide an implement as above, with loading structure for engaging circumferentially supported, ground-lying cylindrical bales, and lifting the latter to an upstanding, end-supported position on a bale-supporting bed.

It is yet another important object of the present invention to incorporate a swingable bale-supporting bed on the machine as above, whereby the end-supported bales may be swung end-first into an adjacent crop disintegrator.

It is a further important object of the present invention to provide an implement as previously described with a disintegrator having an upstanding bank of horizontally extending shredder rolls, adjacent and parallel to the axis of swinging movement of the bale-supporting bed whereby bales on the bed are fed into the disintegrator in a particular disposition conducive to rapid and efficient disintegration of the bales.

In the drawings:

FIG. 1 is a top plan view of a machine constructed in accordance with the principles of the present invention and illustrating a cylindrical bale end-supported upon the horizontal bed thereof;

FIG. 2 is a side elevational view of the machine with portions thereof broken away for purposes of illustration and showing the loading structure in its lowermost ground-adjacent position;

FIG. 3 is a fragmentary, side elevational view of the machine showing the loading structure in its uppermost position against the bale-supporting bed;

FIG. 4 is a front elevational view of the machine having portions thereof broken away for the purposes of illustration;

FIG. 5 is an enlarged, fragmentarh, cross-sectional view taken along line 5—5 of FIG. 1;

FIG. 6 is an enlarged, fragmentary, cross-sectional view taken along line 6—6 of FIG. 1; and FIG. 7 is an enlarged, fragmentary, cross-sectional view taken along line 7—7 of FIG. 1.

There is shown throughout the drawings a bale-loading and disintegrating machine 10 having a main frame 12 supported by a pair of ground-engaging wheels 14 for movement across a field or the like. Although in the embodiment illustrated, frame 12 includes a forwardmost tongue 16 adapting the machine 10 for towing behind a draft vehicle, it is to be understood that, alternatively, the present invention could be self-propelled, pushed ahead of a powered vehicle, or even operated in a stationary emplacement.

In addition to the tongue 16, the frame 12 has a pair of parallel, laterally spaced fore-and-aft extending side rails 18 and 20; an elongate center rail 19 (shown only in FIG. 1) extending parallel to side rails 18, 20; and an elongate, front cross member 22 extending between the side rails 18 and 20. The frame 12 undersupports a substantially rectangular, normally horizontal, bale-supporting bed 24 and carries a laterally mounted disintegrator 26 adjacent the bale-supporting bed 24. Additionally, there is pivotally supported at the rear of frame 12, vertically swingable loading structure 28 for engaging ground-lying cylindrical bales and lifting the latter to an end-supported position upon bed 24.

The bed 24 comprises a rectangular plate 30 having an elongate, cylindrical tube 32 extending along and rigidly secured to one edge thereof. The plate 30 has a substantially flat, upper surface 34 for engaging large cylindrical bales such as indicated by the letter B (FIGS. 1 and 4) and is under-supported by a pair of fore-and-aft spaced, elongate beams 36 which extend transversely across the plate 30 from tube 32 to a point outwardly beyond the edge of the plate 30 remote from tube 32. A pair of upstanding, elongate bars 38 are supported at the respective outermost ends of beams 36 and project upwardly above surface 34 for supporting a fore-and-aft extending elongate member 40. The bars 38 and member 40 combine to form a bale-supporting means for retaining the bale B against movement when the latter is fed into the disintegrator 26 in a manner to be described hereinbelow.

The bed 24 is pivotally mounted on side rail 20 of frame 12 for vertical swinging movement above a fore-and-aft extending axis by a pair of hinge assemblies 44. Each assembly 44 includes a U-shaped collar 46 which passes through a respective rectangular cut-out 48 in plate 30 and wraps around the tube 32. The assembly 44 further comprises a fore-and-aft extending channel segment 50 (shown only in FIG. 5) supported between a pair of triangular gussets 52 (shown only in FIG. 5) on side rail 20 for the purpose of providing a rigid mounting for the collar 46 to secure the latter to frame 12. Thus, as shown in FIG. 5, the tube 32 is rotatably confined between the collar 46 and channel 50 of each hinge assembly 44 whereby the bed is permitted to swing vertically about a fore-and-aft extending axis. A hydraulic cylinder assembly 54 extends between a centrally disposed rib 56 on bed 24 and a depending mount 58 on side rail 18. In this fashion, extension of cylinder assembly 54 causes the bed 24 to move upwardly from the horizontal position shown in FIG. 4 through a position illustrated by 24' to a substantially vertical position adjacent side rail 20.

The disintegrator 26 has a large box-like housing 60 carried substantially outboard of side rail 20 and supporting an upstanding bank of horizontally disposed, fore-and-aft extending shredder rolls 62. The preferred embodiment of the present invention has a pair of rolls 62 which are arranged in an overlying spaced relationship and are of conventional construction; that is, each roll has an elongate, central hub 64 about which is coaxially carried a spirally wound flighting 66 along which is supported a plurality of radially extending knives 68 (shown only in FIG. 4). The rolls 62 are supported for rotation in housing 60 between a pair of upright reinforcing channels 70 on respective front and rear walls of the housing 60. A belt and pulley assembly 72 is carried on the forward wall of housing 60 and operably couples the hubs 64 of rolls 62 to a centrally disposed fore-and-aft extending drive assembly 74 which is adapted for coupling with the power takeoff unit of a conventional farm vehicle. In this manner, the rolls 62 of the disintegrator 26 may be poweredly driven simultaneously in the same direction, it being understood that the desired direction of rotation of the rolls 62 is counterclockwise when the machine 10 is viewed from the forward end as shown in FIG. 4. For the purpose of operator safety and machine life, a cover 76 substantially encloses the belt and pulley assembly 72, and a cover 78 surrounds the drive shaft assembly 74.

The housing 60 substantially encloses the rolls 62, there being one open side 80 in the housing 60 facing toward the opposite side rail 18 to permit access of the bale B into the disintegrator 26. Additionally, the housing 60 has a discharge chute 82 (shown in FIG. 4) outboard of the ground-engaging wheel 14 associated with side rail 20 such that shredded material from bale B may be discharged on the ground or in a feeder bunk as the bale B is being disintegrated.

The loading structure 28 comprises a fork 84 having a pair of elongate, parallel, fore-and-aft extending tines 86 adapted for circumferentially engaging bale B when it is supported on the ground, and a base 88 for supporting the tines 86 in a laterally spaced disposition. The base 88 includes a cross tube 89 extending between the tines 86 and a pair of upstanding brackets 90 supported on opposite ends of tube 89 adjacent respective tines 86. Each bracket 90 has an inwardly projecting trunnion 92 secured thereto and extending transversely of the machine 10. Additionally, the base end of each tine 86 has an L-shaped reinforcing member 94 which includes a mounting leg 95 extending along tine 86 adjacent base 88 and a perpendicular, inwardly projecting leg 96 (shown in FIG. 7).

A pivot assembly 98 mounts the structure 28 at the rear of frame 12 for vertical swinging movement about a horizontal, transversely extending axis. The assembly 98 includes a transversely extending torque tube 100 supported for rotation on side rail 18 and center rail 19 by a pair of respective sleeves 102. The tube 100 has a pair of bell cranks 104 supported on opposite ends thereof for rotation with the tube 100. Each bell crank 104 is pivotally coupled to a respective trunnion 92 at one end, and has a forwardly projecting portion 106 which extends forwardly of the tube 100. The tube 100 is further provided with a depending crank 110 to which is coupled a hydraulic cylinder assembly 112 which extends between the crank 110 and a mounting rib 114 (shown in phantom in FIG. 1) on frame 12, whereby the structure 28 may be poweredly swung through an arcuate, vertical path of travel.

Each forward portion 106 has a short length of chain extending therefrom to a respective leg 96 for a purpose to be described. Thus, viewing FIG. 2 for example, when the cylinder assembly 112 starts to extend, the bell cranks 104 rotate counterclockwise in response to movement of torque tube 100. Note that during this initial extension of the cylinder assembly 112 the fork 84 is not caused to move since the cranks 104 are free to pivot about respective trunnions 92 on the fork 84. However, as the bell cranks 104 continue to rotate in the counterclockwise direction, the forwardmost portions 106 come into contact with the upper edges of legs 96 on the fork 84. At this point, the fork 84 is caused to swing upwardly in response to further extension of cylinder assembly 112 since the bell cranks 104 are not longer free to rotate relative to the fork 84. This particular arrangement normally is sufficient to control both the raising and lowering of the fork 84 since the weight of the latter will usually cause the legs 96 to be biased against the forward portions 106 of bell cranks 104. But note, that when the fork 84 is swung to an over-center position, as shown in FIG. 3, there must be provided some means for coupling the bell cranks 104 to the legs 96 so that clockwise movement of the bell cranks (caused by retraction of the cylinder assembly 112) will cause the fork 84 to swing downwardly. This function is performed by the lengths of chain 108 as shown in FIG. 3, it being further understood that the provision of these flexible lengths of chain is the equivalent of a lost motion linkage which permits the fork 84 to be ground-supported when the fork is swung to its lowermost position, and the forwardmost portions 106 of bell cranks 104 are no longer in contact with the legs 96 on fork 84 as shown, for example, in FIG. 2.

The support function of the frame is enhanced by a centrally disposed cross beam 116 on the frame 12 which underlies the rails 18, 19 and 20 and carries axle structure 118 at opposite ends thereof for supporting the ground-engaging wheels 14. Frame 12 is additionally supplied with a pair of upstanding guides 120 on side rail 18 for engaging the crossbeams 36 of bed 24.

In operation, the machine 10 is normally hitched to a tractor or the like by tongue 16 and the drive shaft assembly 74 is coupled to the power takeoff on the tractor. The bed 24 of the machine 10 is positioned horizontally over the frame 12 with crossbeams 36 supported in guides 120 and the fork 84 is initially raised from the ground to a position shown, for example, in FIG. 3.

The operator then tows the machine 10 to a position in the field adjacent a large circumferentially supported ground-lying cylindrical bale whereupon he actuates cylinder assembly 112 to swing the fork 84 downwardly to a lowermost ground-supported position as shown in FIG. 2. The ground-lying bale is approached from one end with the bale axis in fore-and-aft alignment relative to the machine 10 and the latter is backed to a position wherein tines 86 are disposed on opposite sides of the ground contiguous portion of the bale. The operator next actuates cylinder 112 to raise fork 84 in a manner described hereinabove whereby the bale is swung upwardly and forwardly to an end-supported position on the surface 34 of bed 24. With the bale thus supported, the operator then operates cylinder assembly 54 to swing bed 24 upwardly about its fore-and-aft extending pivotal axis.

As the bed 24 swings through an arcuate path of travel, the bale is introduced to the disintegrator 26 through opening 80 in an end-first manner. As the rolls 62 are rotated due to their drive connection with the power takeoff unit of the tractor, the knives 68 continuously pull, loosen and shred material from the bale, which material is projected laterally and downwardly, and finally discharged through the chute 82.

If it is desired to distribute the shredded material along a feed bunk, the operater merely advances the machine 10 while the bale is being fed into the disintegrator 26. On the other hand, if it is desired to shred the bale for storage in a silo or the like, the machine 10 is held stationary during disintegration of the bale whereupon discharge from chute 82 is maintained in one location.

It is important to note that the machine 10 is also well-suited for transposting bales to a new location for subsequent disintegration. In this connection, the operator first loads a bale with the fork 84 in a manner previously described, and then moves the bale as it is supported on the bed 24 to a new location whereupon the subsequent actuation of cylinder 54 initiates the shredding of the bale.

Swinging the bale into the disintegrator 26 from an end-supported position offers significant advantages over bale-feed positions in conventional loader-disintegrator machines. First, this arrangement serves to swing the axis of the bale through the disintegrator 26 in such a manner that the latter is at no time disposed parallel to the rolls 62 and, consequently, the tendency of the rolls 62 to rotate the bale about its axis during disintegration is eliminated. Secondly, the end-first feeding of the bale into the disintegrator 26 allows for efficient operation of the cutting knives 68 since they are at all times cutting "across the grain" of the round bale.

Having thus described the invention, what is claimed as new and desired to be secured by Letters Patent is:

1. A machine for loading and disintegrating large ground-lying, cylindrical bales of crop material, said machine including:
    a frame;
    a disintegrator supported on said frame;
    a normally horizontal feeding bed on the frame swingable to and from said disintegrator; and
    loading structure pivotally mounted on said frame for vertical swinging movement between the ground and said bed,
    said structure being adapted to engage said ground-lying, cylindrical bale and stand the latter on end upon said bed whereupon the bales are forcibly fed end-first into said disintegrator by swinging movement of the bed toward the disintegrator,
    said bed having a substantially flat support surface and being pivotally secured along one edge to said frame adjacent said disintegrator,
    said support surface being disposed below said disintegrator when said bed is in its horizontal position,
    said bed including support means opposite said one edge and extending above said support surface for retaining said bales on said bed during swinging movement to said disintegrator.

2. A machine as claimed in claim 1, wherein said disintegrator includes an upstanding bank of parallel, horizontally disposed shredder rolls.

3. A machine as claimed in claim 2, wherein the axis of swinging movement for said bed extends parallel to said shredder rolls.

4. A machine as claimed in claim 3, wherein the axis of swinging movement for said structure is perpendicular to the axis of swinging movement for said bed.

5. A machine as claimed in claim 1, wherein said frame is provided with a pair of ground-engaging wheels rotatable about an axis extending transversely of the frame.

6. A machine as claimed in claim 5, wherein said disintegrator includes a bank of parallel, fore-and-aft extending shredder rolls.

7. A machine as claimed in claim 6, wherein the axis of swinging movement for said bed extends parallel to said shredder rolls.

8. A machine as claimed in claim 7, wherein the axis of swinging movement for said structure extends transversely of said frame.

9. A machine as claimed in claim 8, wherein said structure is supported at the rear of said frame and comprises a rigid fork having a pair of elongate, parallel, laterally spaced, fore-and-aft extending tines.

10. A machine as claimed in claim 1, wherein said structure comprises a rigid fork having a pair of elongate, parallel, laterally spaced tines.

11. A machine as claimed in claim 1, wherein a hydraulic cylinder assembly extends between said frame and said structure for powered swinging movement of the structure to and from said bed.

12. A machine as claimed in claim 11, wherein said hydraulic cylinder assembly includes a lost motion connection on said structure for permitting the latter to be ground-supported when the structure is swung to the ground.

13. A machine as claimed in claim 1, wherein a hydraulic cylinder assembly extends between said bed and said frame for powered swinging of the bed toward and away from said disintegrator.

* * * * *